United States Patent
Zhao et al.

(10) Patent No.: US 11,484,031 B2
(45) Date of Patent: Nov. 1, 2022

(54) SEED COATING AGENT FOR PREVENTING AND TREATING WHEAT ROT DISEASE

(71) Applicant: Institute of Plant Protection and Agro-products Safety, Anhui Academy of Agricultural Sciences, Hefei (CN)

(72) Inventors: Wei Zhao, Hefei (CN); Rende Qi, Hefei (CN); Yuankai Chi, Hefei (CN); Shun Cao, Hefei (CN); Xiaofang Cui, Hefei (CN); Ting Li, Hefei (CN); Tao Wang, Hefei (CN)

(*) Notice: Subject to any disclaimer, the term of this patent is extended or adjusted under 35 U.S.C. 154(b) by 183 days.

(21) Appl. No.: 17/130,035

(22) Filed: Dec. 22, 2020

(65) Prior Publication Data

US 2021/0267199 A1    Sep. 2, 2021

(51) Int. Cl.
| | |
|---|---|
| *A01N 43/10* | (2006.01) |
| *A01N 25/04* | (2006.01) |
| *A01N 43/16* | (2006.01) |
| *A01N 43/78* | (2006.01) |
| *A01P 3/00* | (2006.01) |
| *A01N 25/28* | (2006.01) |
| *A01N 55/00* | (2006.01) |
| *A01N 33/22* | (2006.01) |
| *A01N 37/40* | (2006.01) |

(52) U.S. Cl.
CPC .............. *A01N 43/10* (2013.01); *A01N 25/04* (2013.01); *A01N 43/16* (2013.01); *A01N 43/78* (2013.01)

(58) Field of Classification Search
CPC ........ A01N 43/10; A01N 25/04; A01N 43/16; A01N 43/78; A01N 25/28; A01N 55/00; A01N 33/22; A01N 37/40; A01P 3/00
See application file for complete search history.

(56) References Cited

FOREIGN PATENT DOCUMENTS

EP    3064062    *    9/2016    ............. A01N 25/02

* cited by examiner

*Primary Examiner* — Trevor Love

(57) ABSTRACT

A seed coating agent for preventing and treating a wheat rot disease is provided. The seed coating agent includes a fungicide and a seed priming and elicitor. The fungicide includes silthiopham and coumoxystrobin. The seed priming and elicitor includes salicylic acid and compound sodium nitrophenolate. The weight percentage of each components is 1%-60% of the fungicide, 0.0005%-0.05% of salicylic acid, and 0.001%-0.1% of compound sodium nitrophenolate. The seed coating agent has a good effect of promoting seed germination and strengthening seedlings on wheat seeds. Both silthiopham and coumoxystrobin are of low toxicity, and are safe for humans, animals, beneficial organisms, and the environment. It can delay the pathogens resistance to a single agent

5 Claims, No Drawings

SEED COATING AGENT FOR PREVENTING AND TREATING WHEAT ROT DISEASE

TECHNICAL FIELD

The present disclosure relates to the field of agricultural fungicides, and more specifically, to a fungicide composition of silthiopham and coumoxystrobin. After adding salicylic acid and compound sodium nitrophenolate, a seed coating is prepared for the prevention and controlling wheat rot disease.

BACKGROUND

Wheat rot disease is caused by the infection of gaeumannomycesgraminisvar. *Tritici* is a devastating soil-borne disease in wheat production. Wheat rot disease is also called black foot disease. The pathogenic bacteria initially infects the roots of wheat, destroys the root system, forms black roots, hinders the root system from absorbing nutrients, reduces the tillering rate, the number of effective spikes, the number of grains per spike, and the weight of thousand grains, which leads to the formation of white ears and die in the later stage and seriously harms the quality and yield of wheat. In recent years, with changes in farming patterns, a large number of straws returned to the field and mechanized cross-regional operations have gradually increased the damage and scope of wheat rot disease. At present, there is still a lack of varieties with better resistance to wheat rot disease in production, and people mainly rely on chemical pesticides for prevention and controlling. The pathogen infection of rot disease has an incubation period, which is not obvious in the early stage, and it cannot be saved after the symptoms are found. Moreover, because it is a soil-borne disease, the application cost is high and the effect is poor after wheat emergence, and it is basically inoperable. The use of seed coating agents for seed coating for early prevention is the most effective way to prevent and control wheat rot disease.

However, with the widespread use of medicaments, how to delay the generation and development of take-all disease resistance, extend the service life of each composition in the fungicide composition, and develop take-all disease prevention and control agents to achieve economic, high-efficiency, environmental and sustainable protection, has become a strategic issue to be solved urgently in wheat production.

Silthiopham, the chemical name N-allyl-4,5-dimethyl-2-(trimethylsilyl) thiophene-3-carboxamide, is an energy inhibitor by research, possibly ATP Inhibitor. It is safe and environmentally friendly to crops with good protective activity and long last effect. Silithiasamide can directly inhibit the growth and reproduction of the take-all disease bacteria, interfere with the synthesis of pathogenic bacteria. Thereby it can affect and prevent the formation, germination and infection of the disease spores, effectively inhibit the germination of the take-all disease bacteria spores carried by wheat seeds, implement comprehensive and effective protection to the root system of wheat, so as to achieve the purpose of preventing and controlling wheat rot disease.

Coumoxystrobin, chemical name: (E)-2-(2-(3-n-butyl-4methyl-coumarin-7-yloxy) methylphenyl)-3-methoxy Methyl acrylate, is a strobilurin fungicide. It acts on the fungal mitochondrial electron transport chain complex III to prevent electron transport and inhibit the internal energy synthesis of the fungus, thereby to inhibit the fungus with high efficiency and low toxicity. Coumoxystrobin has a good inhibitory and control effect on apple tree rot disease, ring spot disease and other pathogenic bacteria. However, due to its single site of action and long-term repeated use in production, it can lead to the development of pathogenic bacteria and drug resistance, thereby reducing the effectiveness of prevention and even ineffectiveness, resulting in the spread of diseases, crop yields, and pesticide waste.

Both silthiopham and coumoxystrobin are highly effective, low-toxic, and environmentally friendly fungicides. They have different mechanisms of action and have no cross-resistance. The above two types of agents can be used alone to cause the pathogenic bacteria to mutate and form drug resistance in a relatively short period of time, resulting in failure to imitate the disease. Therefore, the combined use of drugs with different mechanisms of action can avoid or delay the development of drug resistance.

Seed vigor and external environmental conditions determine the germination rate of seeds. Therefore, the use of corresponding agents or hormone treatments before seed germination can limit the effects of stress factors. Especially under adverse conditions, such as low temperature, high temperature, drought, salting, waterlogging stress or other abiotic conditions, it can improve seed vigor and promote seed germination, thereby saving seed consumption, reducing cost, and enhancing the resistance to stress at seedling stage, thereby increasing crop yield. Salicylic acid and compound sodium nitrophenolate can play a role in different aspects to affect the germination of seeds and improve the resistance of seeds. Therefore, seed treatment through hormone adjustment can achieve a certain effect, but in different crop types and varieties, the concentration and treatment methods that should be used to achieve the best results are different.

Seed coating agents have been used in agricultural production for years. They have a wide range of applications. In the seed coating agents, pesticides, fungicides, plant growth regulators, fertilizers, rare earths and other ingredients can be added at the same time. Compared with traditional pesticide application methods and seed dressing, seed soaking, it has the effects of high safety, long efficacy period, insect resistance and disease resistance, and yield and income improvement. It has a good controlling effect on seedling diseases and pests, and can promote the development of the root system, so that the seedlings can grow vigorously to improve the yield of crops.

SUMMARY

The present disclosure provides a composition with good sterilization effect and improvement on the control effect of wheat rot disease. At the same time, the composition can improve the germination rate and disease resistance of wheat seeds.

Technical solutions of the present disclosure are specifically described as follows.

The disclosure provides a formula composition for preventing and controlling wheat rot disease based on seed coating, comprising a fungicide and a seed priming and elicitor. The fungicide comprises silthiopham and coumoxystrobin. The seed priming and elicitor comprises salicylic acid and compound sodium nitrophenolate. The weight percentage contents of each component are 1%-60% of the fungicide, 0.0005%-0.05% of salicylic acid, and 0.001%-0.1% of compound sodium nitrophenolate.

For the fungicide comprising silthiopham and coumoxystrobin, the mass ratio of silthiopham and coumoxystrobin is 5:1~1:10.

The composition is made into a suspension seed coating agent by adding an appropriate amount of dispersant agent, antifreeze agent, a film forming agent, thickener and warning coloration. After a certain proportion of coating, the germination rate of wheat seeds is effectively improved, and the take-all diseases of wheat are prevented and controlled effectively.

Compared to the prior art, the disclosure has the following beneficial effects.

Two types of fungicides with different structural types and different mechanisms of action are processed into suspension seed coatings that are easy to use in production by adding salicylic acid and compound sodium nitrophenolate. The suspension seed coatings have high biological activity, improve seed germination rate and survival rate, improve plant disease resistance, reduce the total dosage per unit area, reduce the number of applications, reduce the cost of application, delay the generation and development of pathogen resistance, and extend the use of each component in the bactericidal composition. And it is safe to crops, so as to realize the economic, high-efficiency, and environmental protection purposes.

The application of the fungicide composition in preventing and treating crop fungal diseases is as follows.

Inhibition rate of hyphae growth is converted into inhibition probability value (y), and the concentration of the drug is converted into concentration logarithm (x). The concentration logarithm is used as the abscissa and the probability value is used as the ordinate to make the virulence regression line to obtain the regression equation of the virulence on the pathogen of silthiopham and coumoxystrobin and their mixture, and calculate the EC50 value and the correlation coefficient r value.

According to the Wadley method to evaluate the interaction of the mixture, the calculation formula is as follows:

$$EC50(\text{theoretical value}) = (a+b)/(a/EC50a + b/EC50b),$$

$$SR = EC50(\text{theoretical value})/EC50(\text{actual value}).$$

wherein, a and b are the content ratio of each component in the mixture, and the effect of mixing is analyzed by SR value. If SR≤0.5, the two agents are mixed with antagonistic effect; SR=0.5~1.5, then the two agents are mixed with additive effect; SRS≥1.5, the two agents are mixed with synergistic effect.

TABLE 1

Virulence test results of silothiamine and coumoxystrobin single agent and their mixtures against wheat rot disease

| Ratio(G:D) | Regression equation | Correlation coefficient | $EC_{50}$ ppm | $EC_{50}$(theoretical) ppm | SR |
|---|---|---|---|---|---|
| Silothiamine(G) | y = 5.2105 + 1.3028x | 0.9942 | 0.6893 | | |
| Coumoxystrobin(D) | y = 4.5405 + 1.2621x | 0.9794 | 2.3127 | | |
| 20:1 | y = 5.3520 + 1.3194x | 0.9974 | 0.5410 | 0.7131 | 1.3182 |
| 10:1 | y = 5.2424 + 1.1263x | 0.9883 | 0.6093 | 0.7363 | 1.2084 |
| 5:1 | y = 5.4002 + 1.3568x | 0.9979 | 0.5071 | 0.7806 | 1.5394 |
| 1:1 | y = 5.2195 + 1.2579x | 0.9977 | 0.6691 | 1.0621 | 1.5873 |
| 1:5 | y = 5.004 + 1.3284x | 0.9987 | 0.9931 | 1.6608 | 1.6723 |
| 1:10 | y = 4.8702 + 1.4325x | 0.991 | 1.232 | 1.9049 | 1.5462 |
| 1:20 | y = 4.7545 + 1.3581x | 0.9967 | 1.5162 | 2.0795 | 1.3717 |

The bactericidal properties of silthiopham and coumoxystrobin are analyzed in detail. First, the EC50 (drug safety index) of the two single compounds of silthiostrobin and coumoxystrobin is determined. According to the EC50 of the two single drugs, the combination ratio of the two drugs is determined according to the Wadley method, and synergy coefficient SR value according to Wadley.

The test target is Gaeumannomycesgraminisvar. tritici, which causes wheat rot disease, but it is not limited to this. Silthiopham and coumoxystrobin are taken and prepared into a liquid plate about 15 ml per dish. At the edge of the pre-cultured colony, a 5 mm diameter hyphae block is prepared with a sterile puncher, and then transferred to different medium plates and cultured at 25° C. The test adopts the mycelial growth assay method, and prepares medicated medium according to different treatments. At the edge of the pre-cultured colony, a 5 mm diameter hyphae block is prepared with a sterile puncher, and then transferred to medium plates with different drug contents. The cross method is used to measure the colony diameter. The colony diameter (mm) is measured to calculate the growth inhibition rate by the following formula:

Inhibition rate of hyphae growth %=(1−agent-treated colony diameter−5/control colony diameter−5)× 100%

It can be seen from the above table that the antibacterial effect of different ratios of silthiopham and coumoxystrobin composition on wheat rot disease is different. Generally speaking, the ratio in the range of 20:1 to 1:20 has an additive effect, among which, the ratio of 5:1 to 1:10 has a synergistic effect.

Seed initiator composition 1 with a measured content of 0.06% (compound sodium nitrophenolate 0.05%, salicylic acid 0.01%, the balance water) was diluted 10 times to form seed initiator composition 2 with a content of 0.006% (compound sodium nitrophenolate 0.005%, salicylic acid 0.001%, the balance water). The seed initiator composition 2 was treated with 0.05% compound sodium nitrophenolate, 0.01% salicylic acid and distilled water as a control. The effect on soybean seed vigor was determined according to the above compositions. The experimental wheat variety was "An Nong 0711", and the experiment was carried out in the experimental base of Anhui Academy of Agricultural Sciences. Seed soaking is carried out according to the weight ratio of seed:drug solution=1:2. After soaking for 20 minutes, sowing in the shade and drying in the shade, the seedling emergence rate, plant height, root length and fresh weight are calculated after 40 days.

TABLE 2

Statistics of different composition concentrations on the emergence rate and seedling stage of wheat seeds

| Composition | Emergence rate (%) | Plant height (cm) | Root length (cm) | Fresh weight (10 plants, g) |
|---|---|---|---|---|
| Composition 1 | 92.8 | 12.5 ± 1.7 | 5.8 ± 1.4 | 1.54 ± 0.20 |
| Composition 2 | 92.1 | 13.2 ± 1.9 | 6.8 ± 1.2 | 1.48 ± 0.18 |
| Compound sodium nitrophenolate 0.05% | 85.2 | 11.8 ± 1.7 | 5.2 ± 1.2 | 1.32 ± 0.16 |
| Salicylic acid 0.01% | 83.8 | 10.5 ± 1.7 | 4.8 ± 1.3 | 1.28 ± 0.17 |
| Control | 81.1 | 9.9 ± 1.5 | 4.9 ± 1.6 | 1.25 ± 0.22 |

The experimental results show that the seed initiator composition significantly improves the emergence rate, plant height, root length and fresh weight of wheat.

DETAILED DESCRIPTION OF EMBODIMENTS

The present disclosure will be further described below in conjunction with embodiments, but the essence of the present disclosure is not limited to the following embodiments.

Embodiment 1

Preparation of 18% silthiopham•coumoxystrobin suspension seed coating agent, by mass percentage.

silthiopham: 15%, coumoxystrobin: 3%, plant regulator composition: 0.06% (compound sodium nitrophenolate 0.05%, salicylic acid 0.01%), sodium dodecyl sulfate: 8%, naphthalene sulfonated formaldehyde condensates: 4%, NNO: 2%, ethylene glycol: 5%, magnesium aluminum silicate: 3%, bentonite: 1%, Erit anhydrous fast T: 2%, film former: 5%, dye: 5%, water balance.

Preparation method: According to the formula, weighing the above components (except for film-forming agents and dyes) in proportion, adding them to the ball mill for 60 minutes, filtering, pumping into the dispersion tank for high-speed shearing for 3 minutes, and then fully grinding with a sand mill to control the solid components with particle diameters within 1 μm. After grinding, stirring evenly, and adding film-forming agent and dye to obtain suspension seed coating product.

Embodiment 2

Preparation of 20% silthiopham•coumoxystrobin microcapsule suspension seed coating agent, according to weight percentage.

silthiopham: 10%, coumoxystrobin: 10%, plant regulator composition: 0.06% (compound sodium nitrophenolate 0.05%, salicylic acid 0.01%), methyl oleate: 6%, cyclohexanone: 4%%, diphenylmethane diisocyanate: 6%, fatty amide N-methyl taurate: 3%, ethylenediamine: 1.5%, 1,3-propanediol: 2.5%, dispersant NNO: 4%, magnesium aluminum silicate: 4%, reducing glue: 2%, polyvinyl alcohol: 2%, polyacrylate: 2.5%, permanent red: 3%, water balance.

Preparation method: dissolving the proportions of silthiopham, coumoxystrobin and plant regulator in a solvent, adding diphenylmethane diisocyanate and stirring to obtain the oil phase; adding emulsifiers and auxiliary agents to the water and stirring to obtain water phase; adding the water phase into the oil phase and homogenizing at a high speed to form an oil-in-water emulsion; at 450 rpm, adding ethylenediamine to participate in the interfacial polymerization reaction, increasing the reaction temperature to 55° C., and keeping for 3 hours to solidify into a capsule; adding dispersant NNO, magnesium aluminum silicate, permanent red, polyvinyl alcohol and polyacrylate, stirring evenly to make microcapsule suspension seed coating agent.

Field control experiment of seed coating agent.

In the experiment, Embodiment 1 (18% siliciclofen•coumoxystrobin suspension seed coating agent), Embodiment 2 (20% siliciclofen•coumoxystrobin microcapsule suspension seed coating agent), control agent 1 (12.5% Siliclostrobin suspension seed coating agent), and control agent 2 (10% coumoxystrobin suspension seed coating agent) are tested. The suspension seed coating agent is used for seed coating treatment, the coated wheat seeds are naturally dried in the shade and then sown for sowing. 40 days after sowing, the seedling emergence rate, seedling height, root length, fresh weight and control effect are investigated, and the control effect is investigated 90 days after sowing.

TABLE 3

Effects of different seed coating formulations on the growth of wheat and the prevention and control of wheat rot disease

| Treatment agent | Agent (g): seed (g) | 40 days after sowing | | | | | Control effect 90 days after sowing (%) |
| | | Emergence rate (%) | Plant height (cm) | Root length (cm) | Fresh effect weight (g) | Control after (%) | |
|---|---|---|---|---|---|---|---|
| Embodiment 1 | 1:100 | 90.8 | 12.8 ± 1.7 | 5.3 ± 1.8 | 1.41 ± 0.21 | 95.8 | 88.7 |
| Embodiment 2 | 1:100 | 88.7 | 12.5 ± 1.5 | 4.8 ± 2.4 | 1.49 ± 0.23 | 96.9 | 89.7 |
| 12.5 % Siliclostrobin suspension seed coating agent | 1:50 | 78.6 | 9.2 ± 1.3 | 3.6 ± 2.1 | 1.09 ± 0.17 | 84.8 | 76.3 |
| 10% coumoxystrobin suspension seed coating agent | 1:50 | 81.4 | 10.4 ± 1.6 | 4.1 ± 2 | 1.16 ± 0.21 | 70.5 | 58.4 |
| Blank control | Water | 79.8 | 10.8 ± 1.9 | 3.4 ± 1.9 | 1.13 ± 0.16 | — | — |

The field test results show that the suspension seed coating agent formed by the compound of silthiopham, coumoxystrobin and plant regulators significantly improves the emergence rate, plant height, root length and fresh weight of wheat. The overall prevention and control effect of wheat rot disease is obvious. According to field investigations, within the test dose range, the crops grew normally, and no phytotoxicity or abnormal phenomena were seen on the plants, which is safe for wheat.

Described above are merely illustrative of the disclosure to enable those skilled in the art to implement or use the disclosure, and are not intended to limit the invention. It should be understood that any modifications, replacements or changes made by those skilled in the art without departing from the spirit of the disclosure should fall within the scope of the disclosure.

We claim:

1. A seed coating agent for preventing and controlling wheat rot disease, comprising a fungicide and a seed priming and elicitor; wherein the fungicide comprises silthiopham and coumoxystrobin, and the seed priming and elicitor comprises salicylic acid and compound sodium nitrophenolate.

2. The seed coating agent of claim 1, wherein a mass percentage of each components is 1%-60% of the fungicide, 0.0005%-0.05% of the salicylic acid, and 0.001%-0.1% of compound sodium nitrophenolate.

3. The seed coating agent of claim 1, wherein a mass ratio of silthiopham and coumoxystrobin is 5:1~1:10.

4. The seed coating agent of claim 1, further comprising auxiliary materials; wherein the auxiliary materials comprise one or more of a dispersant agent, an antifreeze agent, a film forming agent, a thickener, or a warning coloration.

5. The seed coating agent of claim 4, wherein the seed coating agent is microcapsule suspension or suspension.

* * * * *